United States Patent Office 2,797,112
Patented June 25, 1957

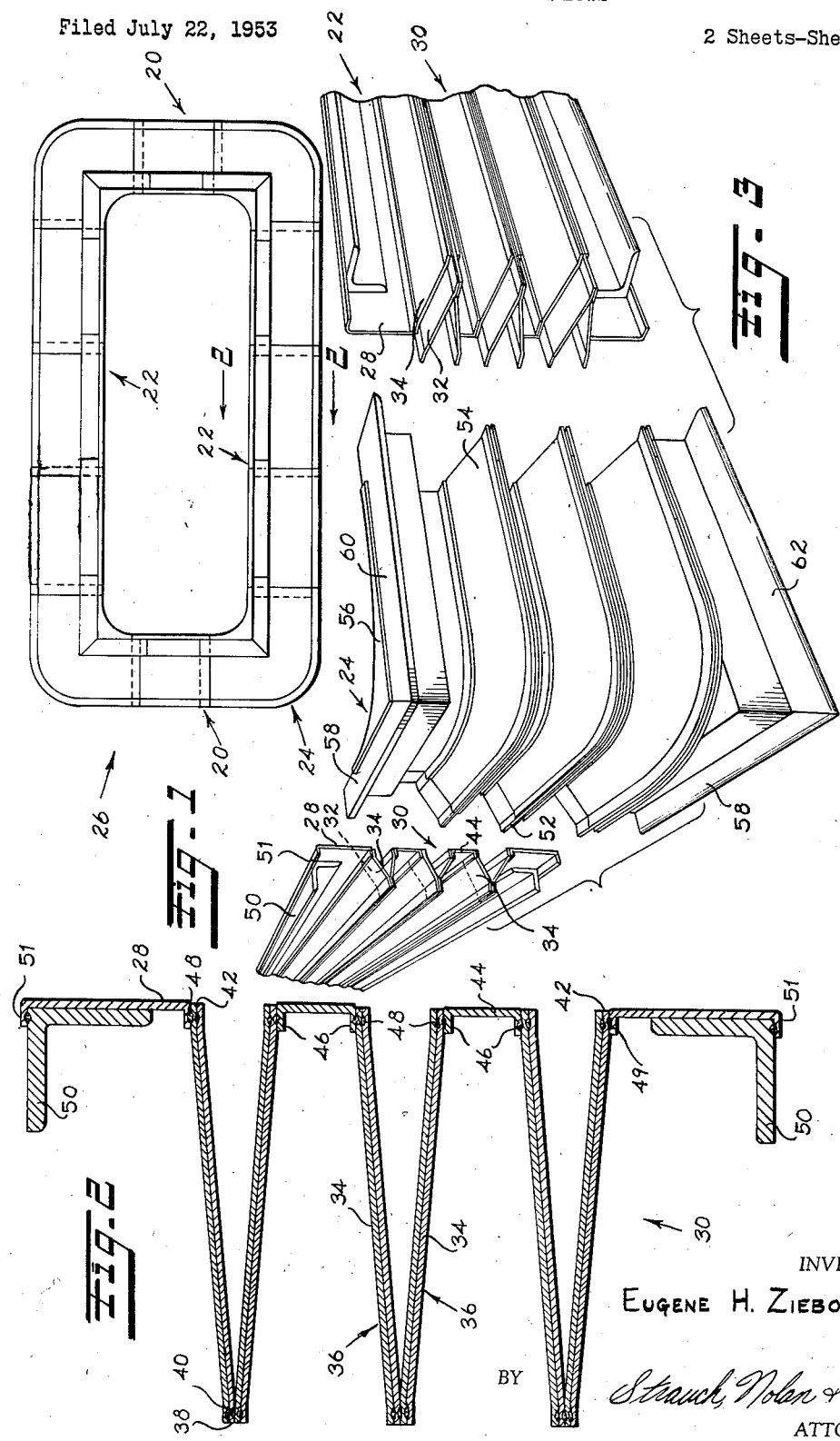

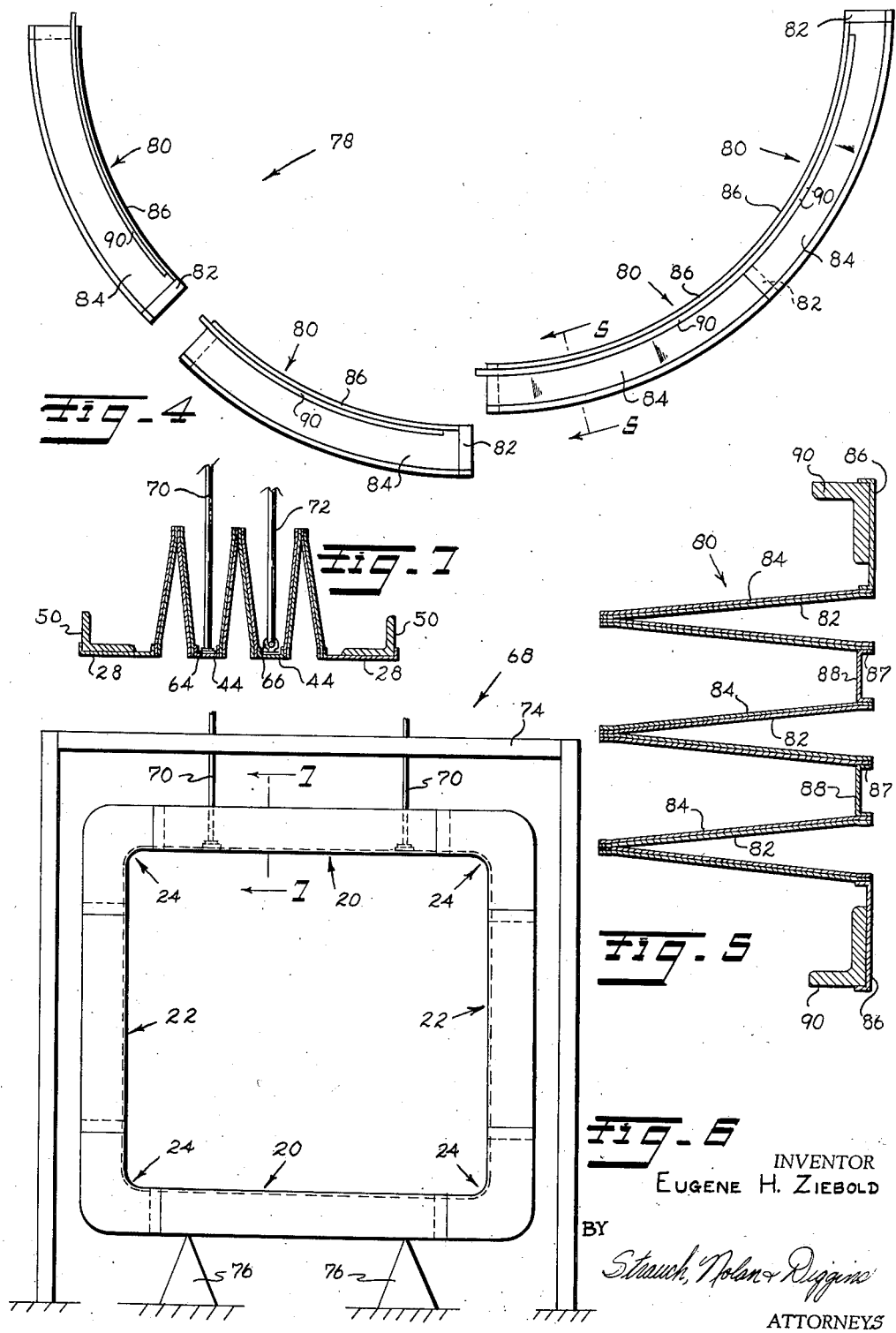

2,797,112

PLURAL LAYER BELLOWS

Eugene H. Ziebold, San Diego, Calif., assignor to Solar Aircraft Company, San Diego, Calif., a corporation of California Application July 22, 1953, Serial No. 369,587

1 Claim. (Cl. 285—226)

This invention relates to flexible members and more particularly to large size tubular polyhedral expansion joints having straight or curved walls, and to novel methods for fabricating and assembling such large size expansion joints.

The increasing development and growth of the industrial and scientific fields have necessitated substantial increases in the size and output of the equipment employed therein such as steam turbines, wind tunnels, and various other apparatus. As a result, the conduits or delivery members associated with such equipment have also steadily increased in cross-sectional and axial dimensions to meet the demands placed on the particular installation. For example, the increasing strides made in the aviation field have necessitated larger and more efficient testing equipment such as variable density wind tunnels which are capable of testing full scale air craft at various simulated operational conditions.

In such an application, the wind tunnel is usually composed of large size tubular members having straight or arcuate walls defining a closed circuit air chamber in which the test airplane is mounted and operational conditions are simulated. With the increase in size and operating conditions of the conduits defining the closed circuit the problem of providing expansion joints of the required size to compensate for the expansion and contraction of the conduits while in operation, or to allow for relative movement of the conduit sections to absorb the vibration of the test equipment has become increasingly acute due to many factors.

It has been the practice prior to this invention to complete the fabrication and assembly of large size expansion joints for such applications at the point of manufacture and then to ship the final product for installation in the field at the point of use.

However, it has been found when dealing with large size expansion joints, as for example, bellows having sides ranging from a few feet up to sizes where the sides are as much as 45 feet by 85 feet, that the most careful and controlled production fabrication techniques still permit a relatively wide tolerance range or dimensional variation. As a result, field installations of these large size expansion joints are often imperfect and costly or impossible due to dimensional discrepancies and the efficiency of the system in which the joint is installed is often seriously impaired.

A second important problem is that of economically transporting such large size expansion joints from the factory to the point of use in an efficient manner which will avoid damaging the joints or altering their dimensions. The transportation problem becomes very acute when such joints have a lateral dimension which cannot be accommodated by standard transportation equipment.

Damage to the joints in transit has often necessitated the return to the point of fabrication for reworking to bring the joint within dimensional limits which will permit field installation, after which the joints are again shipped to the field installation with the possibility of further damage. Obviously repeated shipment of these joints materially affects the cost of the units, and results in a material loss in time and non-productive use of the particular installation.

The improved expansion joint of the present invention and the novel method of fabrication and assembly uniquely and efficiently provided a solution to the foregoing difficulties.

In providing a solution to the aforementioned problems the present invention contemplates the manufacture of large size expansion joints in a novel manner adaptable to production line techniques and which concurrently permits greater control of dimensional variations. Additionally, the novel method of fabricating large size expansion joints as contemplated by this invention allows for greater ease and flexibility in handling the expansion joint during shipment and assures a maximum degree of protection from damage for the joint while in transit. The novel method of field assembly of the novel joint of this invention also permits greater control for a more efficient assembly and allows for compensating adjustment for slight dimensional discrepancies which may exist in the field installation and which could not be compensated for by any known prior art devices.

The foregoing novel benefits and results are attainable from the novel expansion joints of this invention by virtue of novel details of construction which facilitate final assembly of the expansion joints at the point of use. This is made possible by a unique sectionalized construction of the joints, which permits a high degree of dimensional control in production and further permits a substantial reduction in transportation costs. In the field the sections are assembled in a unique manner to form smooth joints which are easily welded in the field to form leak-proof expansion joints. The interrelation of the various joints of the sectionalized elements also permits a sufficient degree of adjustment of the various sections relative to one another to compensate for any dimensional variations of the individual members which comprise the novel expansion joint.

It is therefore a primary object of this invention to provide novel methods for fabricating and assembling expansion joints.

Another object of this invention is to provide novel expansion joints.

A further object of this invention is to provide novel expansion joints particularly adaptable for field assembly.

Still another object of this invention is to provide novel methods for sectionalized construction of large size expansion joints.

Yet another object of this invention is to provide novel methods of fabricating large size expansion joints which permit shipment of the joints in kit form to a field installation and final assembly in a novel manner at the point of use.

An additional object of this invention is to provide novel methods of fabricating large size expansion joints in compact novel sections which are easily baled in compact piles for safe, efficient, and inexpensive transportation.

Still another object of this invention is to provide novel large size tubular expansion joints adapted for easy efficient leakproof assembly in field installations by unskilled technicians.

A further object of this invention is to provide novel methods of fabricating large size expansion joints which are adaptable for production line techniques and permit maximum dimensional control at minimum expense.

These and other objects will become apparent from the following description and appended claims when read in conjunction with the attached drawing, wherein:

Figure 1 is a top or end plan view of one form of expansion joint in its assembled condition constructed in accordance with the present invention;

Figure 2 is a sectional view taken substantially along the line 2—2 of Figure 1;

Figure 3 is an exploded perspective view showing a corner and side panels of the form of joint illustrated in Figure 1;

Figure 4 is a fragmentary exploded end view of a further form of expansion joint constructed in accordance with the present invention;

Figure 5 is a sectional view taken substantially along the line 5—5 of Figure 4;

Figure 6 is an end elevational view of the form of expansion joint illustrated in Figures 1 to 3, illustrating a method and apparatus for field erection of the joint; and Figure 7 is a fragmentary sectional view taken substantially along the line 7—7 of Figure 6.

Referring now to the drawing and more particularly to Figures 1 to 3 the improved expansion joint as constructed by the novel method of this invention comprises end panels 20, side panels 22 and corner sections 24, respectively. In the construction of a rectangular expansion joint as illustrated in Figures 1 to 3 and generally indicated at 26 four corner sections are required. However, the side and end panels may be composed of any number of sections depending upon the dimensions of the assembled joint as will hereinafter appear. As clearly seen in Figures 2 and 3 the sections comprising end panels 20 and side panels 22 include a pair of spaced marginal channel members 28 cut to predetermined lengths which are secured at their respective inner edges to a flexible bellows section generally indicated 30. The bellows convolutions, as clearly seen in Figures 2 and 3 extend laterally outwardly from marginal channels 28. Bellows 30 consists of a plurality of substantially flat relatively thin inner and outer steel sheets 32 and 34, respectively, mounted in respective overlying contacting relation and forming longitudinally extending laminar panels generally indicated 36. Sheets 32 and 34 which comprise laminar panel 36, as clearly seen in Figure 3, are longitudinally offset with respect to each other so that the one end edge of inner sheet 32 extends beyond the adjacent end edge of outer sheet 34 at one end of the panel 36 and conversely the other end edge of inner sheet 32 is spaced inwardly the adjacent end edge of sheet 34. For assembly purposes sheets 32 and 34 may be tack or spot welded at several points to hold the sheets in their longitudinally offset relation.

A pair of laminar panels 36 are mounted with the inner members or sheets 32 of the respective laminar panels in contacting relation along edges 38 and are held, or jigged with the edges of sheets 32 in longitudinal co-extensive alignment. A pair of such jigged panels are secured together in leakproof relation along edges 38 as by means of a roll weld, overlapping spot welds, or brazing, indicated at 40. As best seen in Figure 2, a plurality of panels 36 so connected at their outer edges are connected to each other at their inner edges 42 through intermediately disposed spacer or channel members 44. Spacers 44 are mounted with laterally extending legs 46 in contact with respective outer sheets 34 of an adjacent pair of assembled panels 36 and are secured thereto in leakproof relation as by roll weld or brazing, indicated at 48. Edges 42 of the outermost or marginal panels are also secured in leak proof relation to legs 48 of marginal channel members 28 as by weld 49. Any number of pairs of panels 36 connected along edges 38 can be added between marginal channel members 28 to form a section of any desired width or height. As will be seen from Figure 3, side and end panels 20 and 22, respectively, are both provided with standard angle iron flanges 50 rigidly secured to the outermost legs 51 of marginal channels 28 and longitudinally offset with respect to the channels 28 in the same manner that sheets 32 and 34 are offset with respect to each other. Flanges 50 are supplied in predetermined lengths and assembled in the field, but for purposes of illustration will be described as assembled at the time of fabrication.

Corner sections 24 are fabricated in substantially the same manner as side panels 22 or end panels 20. However, as clearly seen in Figure 3, inner and outer sheets 52 and 54, respectively, and marginal channel members 56 are cut in predetermined curved patterns according to the particular application for which the expansion joint is to be employed. Thus the corner section of the expansion joint can be fabricated upon any desired radius of curvature independently of the side and end panels. Straight reinforcing angle iron flanges 58 and 60 are secured to the members 56 as by welding, the free end of flanges 58 and 60 being aligned respectively with the free ends of members 52 and 54. As clearly seen in Figure 3, the side and end panels will interfit with the corner section in a tongue and groove relation, and as illustrated the outer sheets 54 of corner section 24 at the right hand end will overlie inner sheets 32 of the left hand end of side panel 22 and with the respective inner and outer sheets in edge or end abutting relation. Conversely at the left hand end of corner section 24 inner sheets 52 will lie under outer sheets 34 of the right hand end of end panel 20 with respective end edges of the inner and outer sheets in abutting relation. Flanges 58 and 60 secured to channel members 56 of corner sections 24 extend beyond the ends of corner section 24 and as seen in Figure 3 flanges 50 of the end and side panels 20, and 22 are longitudinally offset as heretofore noted so the adjacent end edges of flanges 50, 58 and 60 are also in abutting relation.

From the foregoing it is readily seen that the various sections of the novel joint interfit in an overlapping essentially tongue and groove relation so that when a weld is made along respective abutting edges of the inner sheets, outer sheets and flanges in the field a smooth leakproof joint is easily formed. As illustrated in Figure 3 flanges 50 of the side and the end panels are both longitudinally offset to allow reception of the ends of flanges 58 and 60, however, the offset of flanges 50 is essentially the same as the offset of inner and outer sheets 32 and 34, respectively, so that if it is desired to join a pair of straight panels such as an end and side, it is merely necessary to rotate one of the panels 180° about a horizontal axis normal to the panel as viewed in Figure 3 to have the proper tongue and groove relation between the panels, since the panels are fabricated to be exactly symmetrical.

From the foregoing it will be seen that the expansion joint of the present invention can be fabricated in a plurality of sections, and as a result of this sectionalized construction the dimensions of each section can be more efficiently controlled since the relatively thin bellows members can be more rigidly jigged and held in proper dimensional relation during formation of each section. Additionally, this sectionalized construction permits a greater ease of storing or transportation of the expansion joint to the field installation without damage, as will now be explained.

Upon completion of fabrication of the panels and corner sections above described the panels may be nested together to form compact space saving bales. For example, a side or end panel is laid on the floor or in a packing crate with the flat face of channel members 28 and spacers 44 adjacent the floor or bottom of the packing crate, the next panel is laid on top in the same manner so that the apices or edges 38 of the lower panel fit in between a pair of converging connected laminar sheets 36, and so on until a compact bale is formed. The corner sections 24 are also stacked or crated in essentially the same manner. It can be readily seen that such a stacking permits the crating or baling of a large number of the panels or sections and prevents relative movement and distortion during shipment. Additionally, the sectionalized construction and compact baling obviously requires less room and permits a greater number of sectionalized joints to be transported than joints which were heretofore completely assembled in the shop, requiring much more space and introducing serious handling problems.

At the site of installation of the novel expansion joint the joint is finally assembled in its connecting relation to the conduits or members to be flexibly joined. Figure 6 illustrates one method of field assembly of the novel joint. For ease of assembly in the field, hanger mounting members are secured to one of the end panels 20 which will be the top of the expansion joint in the field assembly. As illustrated in Figure 7 the hanger mounting members, which can take the form of a threaded boss 64 or screw eye 66 are secured to the outermost or exterior flat faces of spacer 44 as by tack welding. At the point of installation a scaffolding generally indicated 68 of any suitable material is erected. Hangers 70 or 72 threadedly or otherwise secured to the mounting members 64 or 66, as the case may be, are adjustably mounted in horizontal cross member 74 of the scaffolding to hold the upper end panel 20 in the desired relation to the members of the steam turbine, wind tunnel, or the like to be connected. The upper right and left corners 24 are then connected to the top end panel 20 by the novel tongue and groove relation heretofore described and the outside edges, or seams defined by the interconnected members, are seam welded as by oxy-acetylene, torch welding, or brazing to form a completely sealed leakproof seam. Side panels 22 are then connected to the downwardly depending free ends of the upper right and left hand corner sections in the same novel tongue and groove manner and similarly seam welded. The lower end panel, or panels 20 are then suitably positioned in proper relation to the members to be connected and to the sections thus far assembled, as for example by supporting the panel, or panels, on saw horses 76 or some other suitable adjustable supports. The lower left and right hand corner sections are then positioned in place and welded to the side panels and lower end panel to form a completely assembled leakproof expansion joint which is then secured to the members to be connected by suitable connecting means through flanges 50, 58 and 60, after which hangers 70 or 72, scaffolding 68 and saw horses 76 are removed.

Because of the substantial overlapping tongue and groove relation of the various sections a slight adjustment of the various sections relative to each other can be made to compensate for minor dimensional discrepancies that might occur in such large field installations without destroying the sealing ability of the joint since the large overlap permits sufficient material to form a weld connection.

Figures 4 and 5 illustrate a further application of the novel invention herein disclosed as applied to a cylindrical expansion joint generally indicated 78. In this embodiment arcuate sections 80 are constructed in a similar manner to the sections of the rectangular joint illustrated in Figures 1 to 3 with offset inner and outer bellows sheets 82 and 84, respectively, marginal channels 86, spacers 88 and flanges 90 as shown in Figure 5. In assembly the various arcuate preformed sections, which are cut to a predetermined curvature, interfit in the novel described tongue and groove relation as shown by the right hand portion of Figure 4. It will be understood that, the joint may comprise both straight and curved wall panels to metal ducts of widely varying configuration.

A comparison of Figure 2 and Figure 5, will reveal that spacers 44 and 88 are disposed in opposite directions; that is, in Figure 2 legs 46 of the spacers extend outwardly toward the apices of the bellows convolutions and in Figure 5 legs 87 of spacers 88 extend inwardly. The positioning of spacers 44 and 88 in the alternate positions shown in Figures 2 and 5 depends upon the use to which the expansion joint is to be put. If a high positive pressure is to be exerted within the expansion joint then the disposition of the spacers 44 as shown in Figure 2 is preferred for maximum strength of the assembly. If the spacers were disposed as shown in Figure 5 a positive pressure within the joint would act on the face of the spacers and the sides of the legs exerting a large force on the spacers at their corners and possibly causing corner fractures which is not the case if the spacers are disposed as shown in Figure 2. The converse is true if the high positive pressure is acting on the exterior of the expansion joint. Thus the mounting of the spacers whether in a polyhedral or tubular expansion can be adapted to the use to which the joint is to be put.

From the foregoing it will be seen that the present invention provides novel tubular expansion joints and methods of manufacture and assembly adaptable to production line methods with a greater control of dimensions, which are easier and less costly to transport, and which assure more accurate assemblies and efficient operation of field installations.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and equivalency of the claim are therefore intended to be embraced therein.

What is claimed and described to be secured by United States Letters Patent is:

A hollow expansion joint comprising a plurality of wall sections each including a pair of relatively rigid end members, a plurality of intermediate flexible sections of V-section, each flexible section including inner and outer substantially flat sheets secured together along adjacent lateral edges at the apex of said V-section, the ends of the sheets forming the inner layer being offset from the adjacent ends of the sheets forming the outer layer to form tongue and groove constructions at the respective ends of said intermediate sections, means securing one lateral edge of one of said flexible sections to one of said end members, means securing one lateral edge of another of said flexible sections to the other of said end members, means securing the remaining free edges of said flexible sections to the lateral edges of relatively rigid wall members of substantially the same length as said outer sheets, and means securing a plurality of said wall sections together with tongue and groove constructions in interfitting relation.

References Cited in the file of this patent

UNITED STATES PATENTS

| | | |
|---|---|---|
| 494,036 | Smith | Mar. 21, 1893 |
| 1,151,777 | Fulton | Aug. 31, 1915 |
| 1,223,266 | Dyer | Apr. 17, 1917 |
| 1,944,128 | Heigh | Jan. 16, 1934 |
| 1,958,260 | Bigger | May 8, 1934 |
| 2,207,146 | Fentress | July 9, 1940 |
| 2,467,867 | Somerville | Apr. 19, 1949 |
| 2,470,167 | Hobbs | May 17, 1949 |
| 2,481,472 | Culp | Sept. 6, 1949 |
| 2,568,923 | McNeary | Sept. 25, 1951 |
| 2,623,643 | Seamans | Dec. 30, 1952 |